United States Patent [19]

Neveu

[11] 3,961,418
[45] June 8, 1976

[54] LEMON PEELER

[76] Inventor: Michael J. Neveu, 35755 Chestnut, Wayne, Mich. 48184

[22] Filed: July 23, 1975

[21] Appl. No.: 598,418

[52] U.S. Cl. .................................. 30/123.5; 99/590
[51] Int. Cl.² .......................................... A47J 17/04
[58] Field of Search .............. 30/123.5, 123.6, 278, 30/356; 99/590

[56] References Cited
UNITED STATES PATENTS

| 1,452,930 | 4/1923 | Polk | 30/123.5 X |
|---|---|---|---|
| 1,667,596 | 4/1928 | Kapota | 30/356 X |
| 2,010,414 | 8/1935 | Rekonty | 30/123.5 |
| 2,159,299 | 5/1939 | Tanzmann | 30/278 |

FOREIGN PATENTS OR APPLICATIONS

| 694,796 | 7/1953 | United Kingdom | 30/123.5 |

*Primary Examiner*—Al Lawrence Smith
*Assistant Examiner*—J. C. Peters
*Attorney, Agent, or Firm*—Hauke and Patalidis

[57] ABSTRACT

A lemon hand peeler consisting of a generally horseshoe-shaped frame provided with an inwardly arcuate spaced apart cutter blade whose ends are rigidly supported by the frame. The frame is adapted to be held in one hand so as to enable the user to remove the peel from a lemon, or other citrus fruit, by engaging the cutting edge of the blade into the rind of the lemon and rotating manually the lemon for the purpose of separating the rind from the meat.

5 Claims, 5 Drawing Figures

LEMON PEELER

BACKGROUND OF THE PRESENT INVENTION

The present invention relates to a device for peeling a lemon circumferentially for the purpose of removing the rind from the meat so that strips of lemon rind may subsequently be cut for whatever purpose is desired, such as for dropping into alcoholic beverages.

Tools have been in the past devised for removing skin of citrus fruits which may be as simple as a knife provided with a curved blade, as disclosed in U.S. Pat. No. 1,452,930, or which may consist of a handle provided on its end with a pivotal pin and with an adjustable curved blade, as disclosed in U.S. Pat. No. 1,389,765, or which may be provided with a plurality of cutting elements such as disclosed in U.S. Pat. Nos. 1,896,318 and 2,463,167.

Such devices, as found in the prior art, are relatively complicated and sometimes dangerous to operate. Others, as the lemon peeler disclosed in U.S. Pat. No. 3,529,644 and the commercial apparatus such as disclosed in U.S. Pat. No. 2,570,071, are substantially complicated and include many parts, with the result that they are relatively high in cost.

SUMMARY OF THE PRESENT INVENTION

The present invention, by contrast, provides a simple and relatively safe lemon, or other citrus fruit, peeler comprising only two assembled parts, which can be produced at relatively low cost, which is easy and convenient to use, and which permits to separate the rind from the meat without any fuss, while keeping the lemon substantially intact such that the meat thereof may be used for other purposes such as for preparing lemonade or as drink or food lemon flavoring.

The diverse purposes and advantages of the present invention will become apparent when the following description of the best mode contemplated for practicing the invention is read in conjunction with the accompanying drawing, wherein:

DETAILED DESCRIPTION OF THE PREFERRED EMBODIMENT

Figure 1:
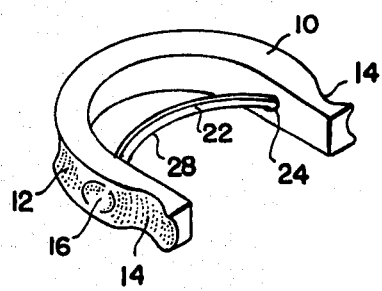
FIG. 1 is a perspective view of a lemon peeler according to the present invention.
Figure 2:
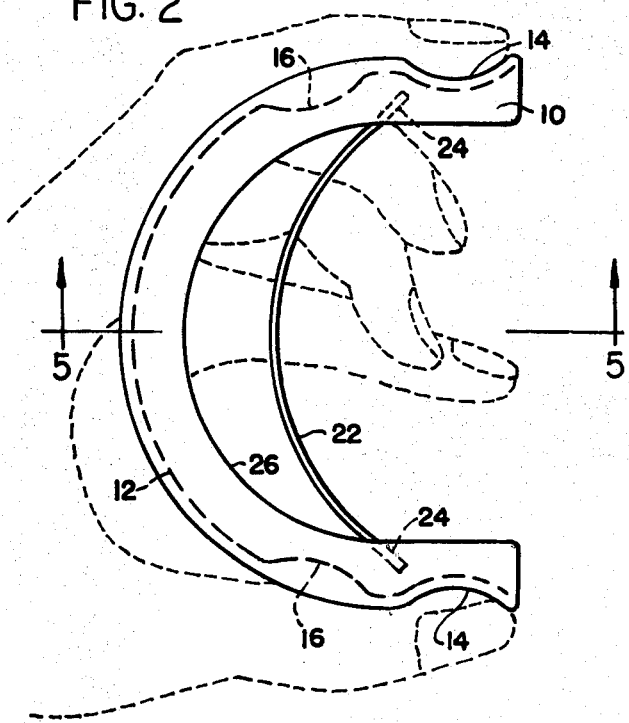
FIG. 2 is a plane elevation view thereof, while being manually supported by the user prior to peeling a lemon or other citrus fruit.
Figure 3:
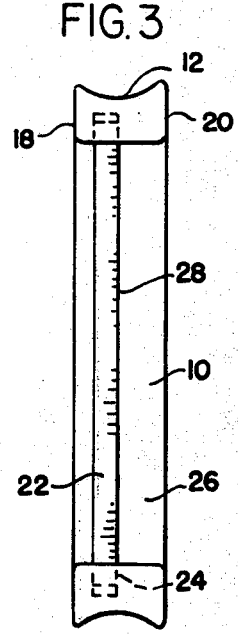
FIG. 3 is an end view thereof.

Referring now to the drawing, a lemon peeler according to the present invention comprises a generally horseshoe-shaped frame 10 made of any convenient material such as aluminum or like metal, or plastic, provided preferably with a concave outer surface as shown at 12. Proximate each end of the horseshoe-shaped frame 10 there is provided a concave recess 14, such that the frame may be grasped between the thumb and the index finger of a person, as illustrated at FIG. 2, the tips of each finger being placed in a recess 14, and a portion of the peripheral surface of the thumb and of the index finger being normally applied against the concave peripheral surface 12 of the frame, so as to effectuate a good grip of the frame 10. If so desired, an additional recess 16, as shown in FIGS. 1 and 2, may be formed proximate each of the recesses 14 such as to accommodate a smaller hand.

The upper and lower faces, 18 and 20, respectively of the frame 10 are substantially flat, and a cutting blade 22 is fastened within the frame 10 by having its ends mounted in appropriate apertures 24 formed in the inner surface 26 of the frame 10. The blade 22 is relatively narrow and is arcuately shaped or bowed so as to follow generally the contour of the frame 10, but with a slightly less bow, such that the blade 22 is disposed a certain distance away from the inner surface 26 of the frame 10, such distance being the greatest at the axis of symmetry of the assembly.

The cutting blade 22 is provided at least with a cutting edge 28, such cutting edge being preferably disposed in a plane situated at mid-distance between the upper face 18 and the lower face 20 of the frame 10.

Figure 5:
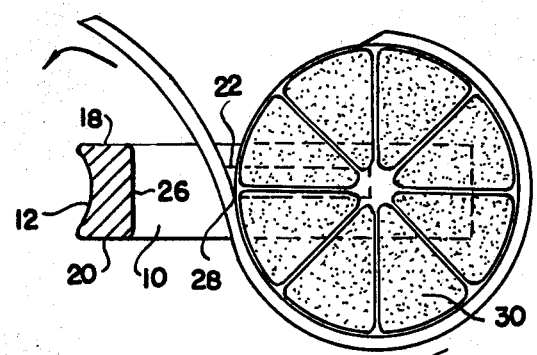
FIG. 5 is a section of the lemon peeler of the invention, as seen from line 5—5 of FIG. 2, while in use for removing the rind of a lemon.
Figure 4:
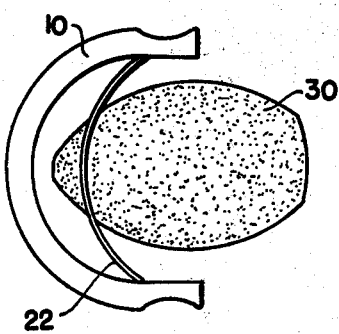
FIG. 4 is a view similar to FIG. 2 but showing the lemon peeler of the invention being used for removing the end portions of a lemon.

In operation, the lemon peeler of the invention is held in one hand, for example the left hand, of a person, as illustrated at FIG. 2. By means of a knife or preferably, by means of the cutter blade 22, the two ends of a lemon 30 are removed, as schematically illustrated at FIG. 4. The lemon 30, with its ends removed, is subsequently held in the right hand of the person and its skin is applied against the cutting edge 28 of the cutting blade 22 so as to effectuate a cut through the skin, preferably to the white membrane just below the skin. The lemon is then rotated manually abouts its longest axis, as schematically illustrated at FIG. 5, so as to remove the skin or rind thereof. As most commercially available lemons are substantially of the same size, the peeler of the invention is capable of accommodating slight variations in size, in view of the thickness of the white membrane separating the skin from the meat of the fruit, and the arcuate shape of the blade 22 substantially conforms to the peripheral shape of the lemon, such that the skin thereof is removed in a continuous cut. The skin may subsequently be cut in strips, according to the taste of the user, and such strips may be twisted and dropped into beverages for the purpose of flavoring such beverages.

Having thus described the present invention by way of an example of structural embodiment thereof, modifications whereof will become apparent to those skilled in the art, what is sought to be protected by United States Letters Patent is as follows:

1. A lemon peeler comprising a horseshoe-shaped frame, and a relatively flat blade having ends each fastened to said frame proximate each end thereof, said blade being arcuately bowed in the same general direction as said frame and having at least one cutting edge.

2. The lemon peeler of claim 1 wherein said frame has an outer concave surface.

3. The lemon peeler of claim 1 wherein said frame has an outer concave recess proximate each end thereof.

4. The lemon peeler of claim 3 wherein said frame has an additional outer concave recess proximate said first mentioned recess.

5. The lemon peeler of claim 1 wherein the cutting edge of said blade is substantially half way between the top and the bottom of said frame.

* * * * *